(12) United States Patent
R et al.

(10) Patent No.: US 12,495,802 B2
(45) Date of Patent: Dec. 16, 2025

(54) PHAGOSTIMULANT FORMULATION FOR CONTROL OF PEST

(71) Applicant: Manoj Kumar R, Yelahanka (IN)

(72) Inventors: Manoj Kumar R, Yelahanka (IN); Vivek Kempraj, Srighandada Kavalu (IN); Vijeth V Arya, Srighandada Kavalu (IN)

(73) Assignee: Manoj Kumar R, Yelahanka (IN)

( * ) Notice: Subject to any disclaimer, the term of this patent is extended or adjusted under 35 U.S.C. 154(b) by 713 days.

(21) Appl. No.: 17/758,668

(22) PCT Filed: Jan. 29, 2021

(86) PCT No.: PCT/IB2021/050699
§ 371 (c)(1),
(2) Date: Jul. 12, 2022

(87) PCT Pub. No.: WO2021/152520
PCT Pub. Date: Aug. 5, 2021

(65) Prior Publication Data
US 2023/0044077 A1    Feb. 9, 2023

(30) Foreign Application Priority Data

Jan. 30, 2020   (IN) .............................. 202041004241

(51) Int. Cl.
*A01N 63/32* (2020.01)
*A01N 25/04* (2006.01)
*A01N 65/08* (2009.01)
*A01P 19/00* (2006.01)

(52) U.S. Cl.
CPC ............. *A01N 63/32* (2020.01); *A01N 25/04* (2013.01); *A01N 65/08* (2013.01); *A01P 19/00* (2021.08)

(58) Field of Classification Search
None
See application file for complete search history.

(56) References Cited

U.S. PATENT DOCUMENTS

2007/0148202 A1* 6/2007 Primo Yufera ...... A01N 25/006
                                                                     424/410
2011/0184040 A1* 7/2011 Taranta ................... A01N 53/00
                                                                     514/427

FOREIGN PATENT DOCUMENTS

| CN | 101411327 A | * | 4/2009 |
| IN | 201641002448 A | | 7/2017 |
| WO | 9637106 A1 | | 11/1996 |

OTHER PUBLICATIONS

Machine translation of CN101411327A (2025).*

Aleryan, M. A. S., Ramadan, H. M., and Salem, M. H. 2006. Oviposition Stimulants of the peach fruit fly *Bactrocera zonata* (Saunders) (Diptera: Tephritidae) under laboratory conditions. J. Egypt. Soc. Toxicol. 34: 1-4.

Alyokhin, A., Messing, R. H., and Duan. J. J. 2000. Visual and olfactory stimuli and fruit maturity affect trap captures of oriental fruit flies (Diptera: Tephritidae). J. Econ. Entomol. 93: 644-649.

Anjum S., Razag, M., and Yazadni, M. S. 2000. Studies on seasonal activity and control of fruit flies (*Dacus* spp.) on mango (*Mangifera indica* L.) at Faisalabad, Pakistan. Arab J. Plant Prot. 18: 121-123.

Clarke, A. R., Armstrong, K. F., Carmichael, A. E., Milne, J. R., Raghu, S., Roderick, G. K., and Yeates, D. K. 2005. Invasive phytophagous pests arising through a recent tropical evolutionary radiation: The Bactrocera dorsalis complex of fruit flies. Annu. Rev. Entomol. 50: 293-319.

Cornelius, M. L., Duan, J. J., and Messing, R. H. 1999. Capture of oriental fruit flies (*Diptera: Tephritidae*) by protein-baited traps and fruit-mimicking visual traps in a guava orchard. Environ. Entomol. 28: 1140-1144.

Cornelius, M. L., Duan, J. J., and Messing, R. H. 2000a. Volatile fruit odours as attractants for the oriental fruit fly (*Diptera: Tephritidae*). J. Econ. Entomol. 93: 93-100.

Cornelius, M. L., Nergel, L., Duan, J. J., and Messing, R. H. 2000b. Responses of female oriental fruit flies (*Diptera: Tephritidae*) to protein and host fruit odours in field cage and open field tests. Environ. Entomol. 29: 14-19.

Drew, R. A. I., and Raghu, S. 2002. The fruit fly fauna (*Diptera: Tephritidae: Dacinae*) of the rainforest habitat of the Western Ghats, India. The Raffles Bull. Zool. 50: 327-352.

International Search Report & Written Opinion dated Apr. 29, 2021 from PCT Application No. PCT/IB2021/050699, 8 pages.

Summary of Ishtiaq, A., Farman, U., and Alamkhan, S. 1999. Efficacy of various insecticides and trap heights in methyl eugenol baited traps against fruit flies (*Bactrocera* spp.). Sarhad J. Agric. 15: 589-594.

Kamala Jayanthi, P. D., and Verghese, A. 2001. A simple and cost-effective mass rearing technique for the tephritid fruit fly, *Bactrocera dorsalis* (Hendel). Curr. Sci. 82: 266-268.

Kamala Jayanthi, P. D., Christine M Woodcock, John Caulfield, Michael a Birkett and Toby J A Bruce. 2012. Isolation and identification of host cues from mango, *Mangifera indica*, that attract gravid female oriental fruit fly, *Bactrocera dorsalis*. J Chem. Ecol 38: 361-369.

Kamala Jayanthi, P. D., Vivek Kempraj, Ravindra M. Aurade, Ravindra K. V., Bakthavatsalam. N, Abraham Verghese and Toby. J. A. Bruce. 2014. Oviposition site-selection by Bactrocera dorsalis is mediated through an innate recognition template tuned to γ-octalactone. PLOS One. 10.1371/journal.pone.0085764.

(Continued)

*Primary Examiner* — H. Sarah Park
(74) *Attorney, Agent, or Firm* — INNOVATION CAPITAL LAW GROUP, LLP; Vic Lin (57) ABSTRACT

The present invention discloses a formulation comprising phagostimulants or kairomones, stabilizer, emulsifying, thickening and temperature stabilizing agents to control Tephritid fruit fly (*Bactrocera cucurbitae*) by attracting both male and female of all stages thereby said formulation finds a prominent place in integrated pest management, control and eradication programs of tephritid fruit flies. The process of preparation of the formulation is also disclosed in the present invention.

8 Claims, 11 Drawing Sheets

(56) References Cited

OTHER PUBLICATIONS

Metcalf, R. L. and Metcalf, E. R. 1992. Plant Kairomones in Insect Ecology and Control. Chapman and Hall, New York.

Metcalf, R. L., Mitchell, W. C., and Metcalf, E. R. 1983. Olfactory receptors in the melon fly *Dacus cucurbitae* and the oriental fruit fly *Dacus dorsalis*. P. Natl. Acad. Sci. USA. 80: 3143-3147.

Metcalf (1994). Role of Kairomones in Integrated Pest Management. , 22(4), 275-279. doi:10.1007/bf02980528 . Publication date: Jan. 1, 1994.

Pinero, J. C., Mau, R. F. L., and Vargas, R. I., 2009. Managing oriental fruit fly, *Bactrocera dorsalis* (Diptera: Tephritidae), through spinosad-based protein bait sprays and sanitation in papaya orchards in Hawaii. J. Econ. Entomol. 102: 1123-1132.

Ponnusamy, L., Xu, N., Nojima, S., Wesson, D. M., Schal, C., and Apperson, C. S. 2008. Identification of bacteria and bacteria-associated chemical cues that mediate oviposition site preference by Aedes aegypti. P. Natl. Acad. Sci. USA. 105: 9262-9267.

Shelly, T. E. 2000. Fecundity of female Oriental fruit flies (*Diptera: Tephritidae*): Effects of methyl eugenol-fed and multiple mates. Annu. Entomol. Soc. Am. 93: 559-546.

Siderhurst, M., and Jang, E. 2006. Female-biased attraction of oriental fruit fly, *Bactrocera dorsalis* (Hendel), to a blend of host fruit volatiles from Terminalia catappa L. J. Chem. Ecol. 32: 2513-2524.

Stephens, A. E. A., Kriticos, D. J., and Leriche, A. 2007. The current and future potential geographical distribution of the oriental fruit fly, *Bactrocera dorsalis* (Diptera: Tephritidae). Bull. Entomolo. Res. 97: 369-378.

Vargas, R. I., and Chang, H. B. 1991. Evaluation of oviposition stimulants for mass production of melon fly, *oriental fruit fly*, and Mediterranean fruit fly (*Diptera: Tephritidae*). J. Econ. Entomol. 84: 1695-1698.

Verghese, A., and Kamala Jayanthi, P. D. 2001. Integrated pest management (IPM) in major fruit crops pp. 1-23 in: Parvatha Reddy, P., Verghese, A., Krishna Kumar, N. K. (Eds.), Pest Management in Horticultural Ecosystems. Capital Publishing Company, New Delhi.

Verghese, A., Madhura, H. S., Jayanthi, P. D. K., and Stonehouse, J. M. 2002. Fruit flies of economic significance in India with special reference to Bactrocera dorsalis (Hendel). pp. 317-324 in Proceedings of the 6th International Symposium on Fruit Flies of Economic Importance, Stellenbosch, South Africa, May 6-10, 2002.

Verghese, A., Tandon, P. L., and Stonehouse, J. M. 2004. Economic evaluation of the integrated management of the oriental fruit fly, *Bactrocera dorsalis* (Diptera: Tephritidae) in mango in India. Crop Prot. 23: 61-63.

Verghese, A., Uma, M. S., Kamala Jayanthi, P. D., Mouly, M., and Helen, M. 2011. Evidence of a random ovipositional strategy by female fruit fly *Bactrocera dorsalis* (Tephritidae: Diptera) with reference to host quantum. Curr. Sci. 100: 25-26.

Yuan, M., Wang, B., Song, C. B., Rong. X. L., and Yin, Y. 2008. Effect of climate factors and host plants on population dynamics of Bactrocera dorsalis (Hendel) in Suzhou. J. Anhui Agri. Sci. 22: 9619-9621.

\* cited by examiner

PHAGOSTIMULANT FORMULATION FOR CONTROL OF PEST

CROSS REFERENCE TO RELATED APPLICATION

The present application claims priority from the Provisional Application No. IN 202041004241 filed on Jan. 30, 2020, the full disclosure of which is hereby incorporated by reference herein.

FIELD OF THE INVENTION

The present invention relates to a formulation for the management and control of agricultural pests, more particularly to a phagostimulant formulation for trapping both male and female of Tephritid fruit fly (*Bactrocera cucurbitae*) and its process of preparation.

BACKGROUND OF THE INVENTION

Tephritid fruit flies are important pest of tropical fruit and vegetable crops around the globe (Drew & Raghu, 2002). They cause significant economic losses through fruit damage; fruit drop and export limitation due to quarantine issues (Metcalf and Metcalf, 1992; Verghese et al., 2002; Clarke et al., 2005). Additionally, their broad host range, climate tolerance and high reproductive rate make them a serious pest with extreme invasive potential (Shelly 2000; Stephens et al., 2007; Yuan et al., 2008). This has motivated researchers to develop trapping systems such as use of para-pheromone traps, but these are mostly directed towards male flies (Cornelius et al., 1999, 2000 a, b; Ishtiaq et al., 1999; Anjum et al., 2000; Verghese and Kamala Jayanthi, 2001; Verghese et al., 2004; Pinero et al., 2009).

Because females are responsible for fruit damage owing to egg-laying (Siderhurst and Jang, 2006), it is therefore important to formulate new methods to trap females. Fruit fly females lay eggs in mature fruits and distribute single batches of eggs into as many fruits as possible. However, if the supply of mature fruits is limited, they lay most of their eggs into a single fruit (Verghese et al., 2011). Oviposition behavior in fruit flies is mediated by cues from mature fruits and the rotting smell of fruits (Metcalf et al., 1983; Cornelius et al., 2000a). Visual and olfactory cues direct flies to the fruit (Alyokhin et al., 2000), upon contact, the phagostimulants cause females to feed and oviposit into fruits. However, there is a paucity of information regarding the identity of compounds that stimulate feeding in fruit flies. Some compounds from fruits and microorganisms, implicated as fruit fly attractants, may be effective phagostimulants, but the search for attractants has overshadowed these compounds. Although, previous studies have used crude juice, pulp of fruits and yeast hydrolysate as phagostimulants of fruit fly species, studies regarding defined chemicals do not exist (Vargas and Chang, 1991; Aleryan et al., 2006).

The existing para-pheromone traps seem to have no effect on the fruit fly population, because of the polygamous nature of the insect. The female flies that have already mated with males that have escaped trapping are enough to multiply populations to large numbers.

The present invention is directed towards the need in the art to develop a formulation which can trap both male and female of *B. cucurbitae* including gravid thereby effectively controlling the pest of tephritid fruit flies. The trapping technology is an environment friendly green approach without the inclusion of toxic insecticide. The instant invention satisfies these needs, as well as others, and generally overcomes the deficiencies found in the background art.

OBJECT OF THE INVENTION

The main object of the invention is to develop an environmentally safe method for trapping the males and females of *B. cucurbitae*.

It is another object of the invention to develop a phagostimulant blend for *B. cucurbitae*.

It is yet another object of the invention to develop formulations based on the phagostimulant blend for effective trapping of *B. cucurbitae*.

Other objects of the inventions will be apparent from the description of the invention herein below.

SUMMARY OF THE INVENTION

A phagostimulant formulation for control of pest Tephritid fruit fly, *Bactrocera cucurbitae* is disclosed in the present invention wherein said formulation attracts both male and female of fruit fly and effectively controls the major pest in agriculture.

In an aspect of the present invention, the formulation comprises phagostimulants selected from ethyl hexanoate esters, gamma octalactone, delta octalactone, acetic acid, β-ocimene, cis-ocimene and cucurbitacin A, B & D and at least one suitable additional agent.

In another aspect of the present invention, the phagostimulants comprises in combination or blend ethyl hexanoate esters, gamma octalactone, delta octalactone, acetic acid, β-ocimene, cis-ocimene and cucurbitacin A, B & D in the ratio ranging from 2:3.5:2:5:4:1:1 to 12:3:0.5:9:3:5:1

In certain aspects of the present invention, the additional agent includes stabilizer, emulsifier, thickening agent, temperature stabilizing agent, other excipients or mixtures thereof.

In an aspect of the present invention, the stabilizer is selected from glycerol, polyethylene glycol (PEG) or polyvinyl alcohol (PVA) and the concentration of stabilizer is in the range of 0.5 to 10% w/v of the formulation.

In an aspect of the present invention, the emulsifier and thickening agent is selected from gums, starches or polysaccharides and the concentration of emulsifier and thickening agent is in the range of 0.5 to 10% w/v of the formulation.

In an aspect of the present invention, the temperature stabilizing agent is selected from ammonium carbonate, ammonium bicarbonate, diammonium phosphate or ammonium acetate and the concentration of temperature stabilizing agent is in the range of 0.05 to 5% w/v of the formulation In an aspect of the present invention, the liquid formulation comprises phagostimulants or kairomones as blend (0.1-5% w/v); glycerol as stabilizer (0.5 to 10% w/v); xanthum gum as emulsifying and thickening agent (0.5 to 10% w/v) and ammonium acetate as temperature stabilizing agent (0.05 to 5% w/v).

A process of preparation of phagostimulant formulation is also disclosed in the present invention.

BRIEF DESCRIPTION OF THE DRAWINGS

For a better understanding of the invention, few embodiments are described below with reference to the accompanying figures, purely by way of example and non-limiting in which:

FIG. 1.

DETAILED DESCRIPTION OF THE INVENTION

For the better understanding of the objects, technology and advantages of the present invention, the instant invention will be further explained in detail with respect to embodiments and accompanying figures as given above. It should be understood that the specific embodiments described herein are only to be used for explaining the present invention but not used to limit the present invention A Phagostimulant formulation for control of the pest Tephritid fruit fly, *Bactrocera cucurbitae* is presented in this disclosure. In the following description, for the purpose of explanation, numerous specific details are set forth to provide a thorough understanding of the invention.

The present invention provides, in an aspect, the formulation for the control of Tephritid fruit fly, *Bactrocera cucurbitae* by attracting both male and female, comprises phagostimulants and at least one suitable additional agent.

In an embodiment, the invention provides phagostimulants or kairomones including ethylhexanoate esters, gamma octalactone, delta octalactone, acetic acid, β-ocimene, cis-ocimene and cucurbitacin A, B & D.

After large number of experimentations, the inventors of the present invention identified that the phagostimulants ethyl hexanoate esters, gamma octalactone, delta octalactone, acetic acid, β-ocimene, cis-ocimene and cucurbitacin A, B & D either alone or in combination have the capacity to trap both male and female of *B. cucurbitae* including gravid thereby effectively controlling the pest of tephritid fruit flies.

In an embodiment, the phagostimulants or kairomones including ethyl hexanoate esters and lactones namely gamma octalactone and delta octalactone are extracted from yeast *Saccharomyces cerevisiae*.

In an embodiment, the phagostimulants or kairomones including acetic acid, β-ocimene, cis-ocimene and cucurbitacin A, B & D are extracted from cucumbers.

The phagostimulants from the yeast and cucumbers can be obtained by employing appropriate methodologies known to the person skilled in the art. Phagostimulants may be obtained from yeast and cucumbers by employing extraction method selected from but not limiting to head-space technique, pressurized liquid extraction, microwave-assisted extraction, supercritical fluid extraction, and sonication assisted extraction. Such extraction techniques may be coupled with suitable purification technique like chromatographic techniques.

In an embodiment, the phagostimulants or kairomones including ethyl hexanoate esters, gamma octalactone, delta octalactone, acetic acid, β-ocimene, cis-ocimene and cucurbitacin A, B & D are extracted from yeast and cucumbers by solid phase micro extraction method followed by characterization using Gas chromatography-Mass spectrometry (GC-MS).

In an embodiment, the formulation of the present invention comprises blend of phagostimulants or kairomones i.e. in combination of two or more phagostimulants or kairomones in an appropriate quantity sufficient to attract both male and female of Tephritid fruit fly.

In an embodiment, the blend A1 comprises ethyl hexanoate esters, gamma octalactone, deltaoctalactone.

In another embodiment, the blend A2 comprises acetic acid, β-ocimene, cis-ocimene and cucurbitacin A, B & D.

In an embodiment, the blend A3 is a combination of A1 and A2.

When used in combination ethyl hexanoate esters, gamma octalactone, delta octalactone, acetic acid, β-ocimene, cis-ocimene and cucurbitacin A, B & D are included in ratio such that the blend of the phagostimulants is sufficient to trap the male and female of Tephritid fruit fly.

In an embodiment, blend comprises phagostimulants in a combination of ethyl hexanoate esters, gamma octalactone, delta octalactone, acetic acid, β-ocimene, cis-ocimene and cucurbitacin A, B & D in the ratio ranging from 2:3.5:2:5:4:1:1 to 12:3:0.5:9:3:5:1

In an embodiment, the cucurbitacin A, B & D are mixed in equal proportions.

In an embodiment, the concentration of blend is in the range of 0.1%-5% by w/v of the formulation.

In certain embodiments, the suitable additional agent includes carriers, diluents, emulsifiers, gelling agents, thickening agents, suspension agents, stabilizers, or any other excipient, adjuvant or mixtures thereof.

In certain non-limiting embodiment, the stabilizer includes but not limited to glycerol, polyethylene glycol (PEG), polyvinyl alcohol (PVA).

In an embodiment, the stabilizer is at least 0.5% by w/v of the formulation.

In an embodiment, the concentration of the stabilizer is in the range of 0.5-10% by w/v of the formulation.

In an embodiment, the formulation includes emulsifiers and thickening agents. The emulsifying and thickening agent may be selected but not limiting to gums, starches or polysaccharides.

In an embodiment, the emulsifying and thickening agent is at least 0.5% by w/v of the formulation.

In an embodiment, the concentration of the emulsifying and thickening agent is in the range of 0.5-10% by w/v of the formulation.

In an embodiment, the formulation includes temperature stabilizing agent selected but not limiting to ammonium carbonate, ammonium bicarbonate, diammonium phosphate and ammonium acetate. The said agent is added to preserve the formulation for longer duration.

In an embodiment, the temperature stabilizing agent is at least 0.05% by w/v of the formulation.

In an embodiment, the concentration of the temperature stabilizing agent is in the range of 0.05-5% by w/v of the formulation.

The present invention can be formulated in to any suitable formulation by selecting the suitable additional agent, specifically it can be formulated as a blend, liquid formulation and nano-formulation.

The present invention provides, in another aspect, a process for the preparation of a formulation for control of the pest Tephritid fruit fly, *Bactrocera cucurbitae* comprising the steps of:

(i) Preparing solution A, wherein the phagostimulants or kairomones are added one by one in an appropriate quantity in 99% ethanol;
(ii) Preparing solution B, wherein stabilizer, emulsifying, thickening and the temperature stabilizing agents in an appropriate quantity are mixed in a sterile distilled water;
(iii) Mixing Solution A and B in the ratio of 1:1.5 to 1:12 to obtain the formulation C with required consistency.

In an embodiment, the phagostimulants in solution A is blend A1 comprising ethyl hexanoate esters, gamma octalactone, deltaoctalactone.

In an embodiment, the phagostimulants in solution A is blend A2 comprising acetic acid, β-ocimene, cis-ocimene and cucurbitacin A, B & D.

In an embodiment, the phagostimulants in solution A is blend A3 which is a combination of blend A1 and A2 comprising ethyl hexanoate esters, gamma octalactone, delta octalactone, acetic acid, β-ocimene, cis-ocimene and cucurbitacin A, B & D in the ratio ranging from 2:3.5:2:5:4:1:1 to 12:3:0.5:9:3:5:1

In an embodiment, the solution B comprises stabilizer in the range of 0.5 to 10% w/v; emulsifying and thickening agent in the range of 0.5 to 10% w/v and temperature stabilizing agent in the range of 0.05 to 5% w/v.

In an embodiment, the formulation C is C1 (A1+B), C2 (A2+B) or C3 (A3+B).

In a non-limiting illustrative example of the present invention, the liquid formulation comprises phagostimulants or kairomones as blend (0.1-5% w/v); glycerol as stabilizer (0.5 to 10% w/v); xanthum gum as emulsifying and thickening agent (0.5 to 10% w/v) and ammonium acetate as temperature stabilizing agent (0.05 to 5% w/v).

The instant invention is a cost effective, long lasting (3-6 months) and an eco-friendly technique of trapping male and female fruit flies for IPM in vegetables and fruits (melons, cucumber, ridge gourd etc.). By installing 10 traps with the lure formulation of the present invention per acre both male and female fruit flies of all stages can be effectively monitored and trapped. The formulation of the present invention attracts more of females which are the main cause of fruit destruction.

The above description of the invention, together with the below accompanying examples should not be construed as limiting the invention because those skilled in the art to which this invention pertains will be able to devise other forms thereof within the ambit of the appended claims.

EXAMPLES

Example 1: Method of Extraction of Phagostimulants or Kairomones from Yeast

The volatile metabolites of the yeast *Saccharomyces cerevisiae* were analysed by headspace solid phase microextraction (HS-SPME) combined with comprehensive two-dimensional gas chromatography coupled to mass spectrometry with a high resolution time of flight analyser (GC×GC-ToFMS). The SPME device included a fused silica fibre coating partially cross-linked with 50/30 μmdivinylbenzene/carboxen/poly(dimethylsiloxane) (DVB/CAR/PDMS), with 1 cm of length. The SPME fibre was conditioned at 260° C. for 30 min in the GC injector. The samples stored at −80° C. in sampling vials were dethawed and placed in a thermostatic water bath adjusted to 40.0±0.1° C. for 15 min to promote the transference of the metabolites from the sample to the headspace. After this step, the SPME fibre coating was manually inserted into the sample vial headspace for 45 min to obtain the free volatile metabolites. Three independent cultures were analysed from each *S. cerevisiae* strain.

The phagostimulants or kairomones obtained were ethyl hexanoate esters, gamma octalactone and delta octalactone.

Example 2: Method of Extraction of Phagostimulants or Kairomones from Cucumber

Cucumber fruits were placed into jars (3 litres) with purified air passing through activated charcoal into the jar. Aerations were run for 48 h using a tube (3 cm×6 mm ID) of Super Q (Alltech Associates, Deerfield, IL, USA) held in place with glass wool plugs. The collected materials were extracted with 3 ml n-hexane (HPLC grade) and stored at −80° C. until for further assays.

The phagostimulants or kairomones obtained were acetic acid, β-ocimene, cis-ocimene and cucurbitacin A, B & D.

Example 3: Identification of Phagostimulants or Kairomones with GC-MS

Figure 1A:
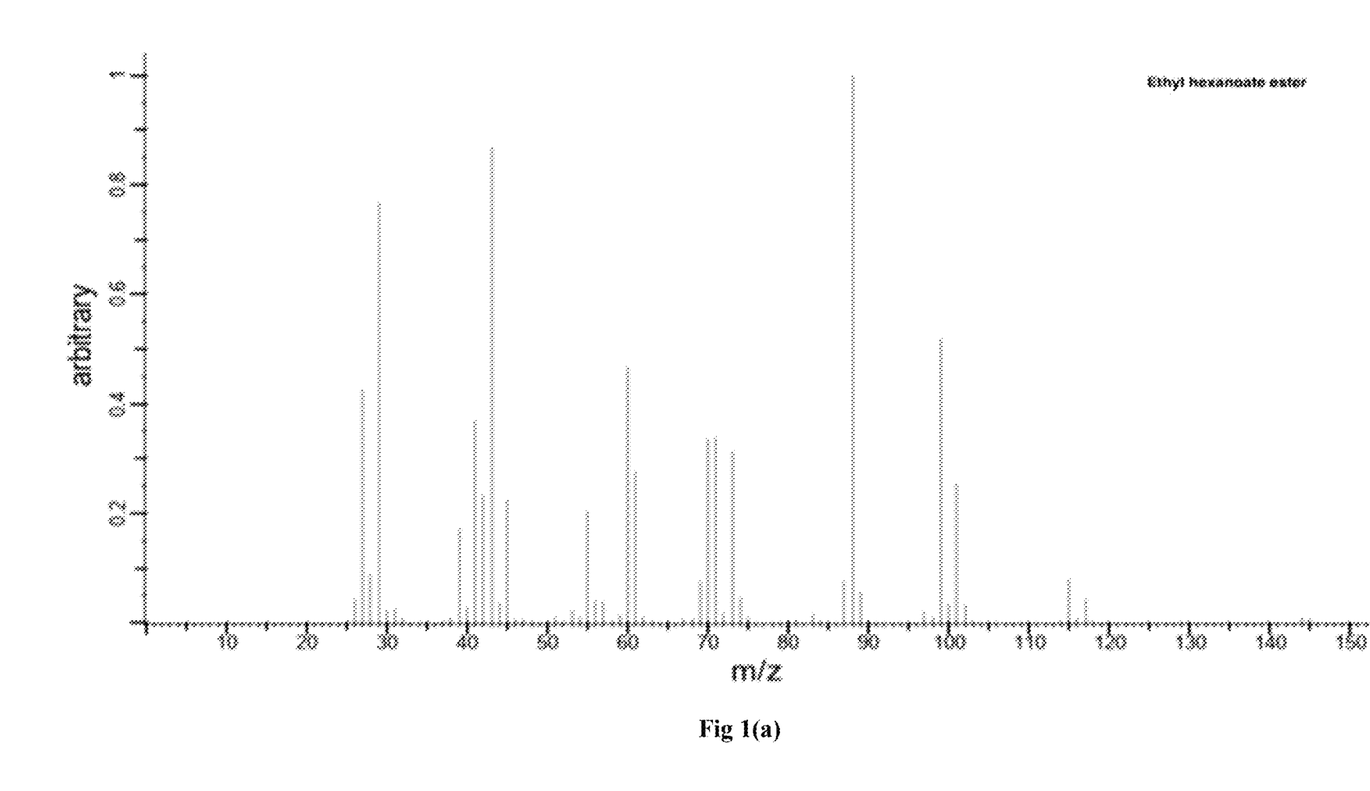
FIGS. 1(a) to 1(i) are MS (Mass spectra) of phagostimulants ethyl hexanoate esters, gamma octalactone, delta octalactone, acetic acid, β-ocimene, cis-ocimene and cucurbitacin A, B & D.
Figure 1B:
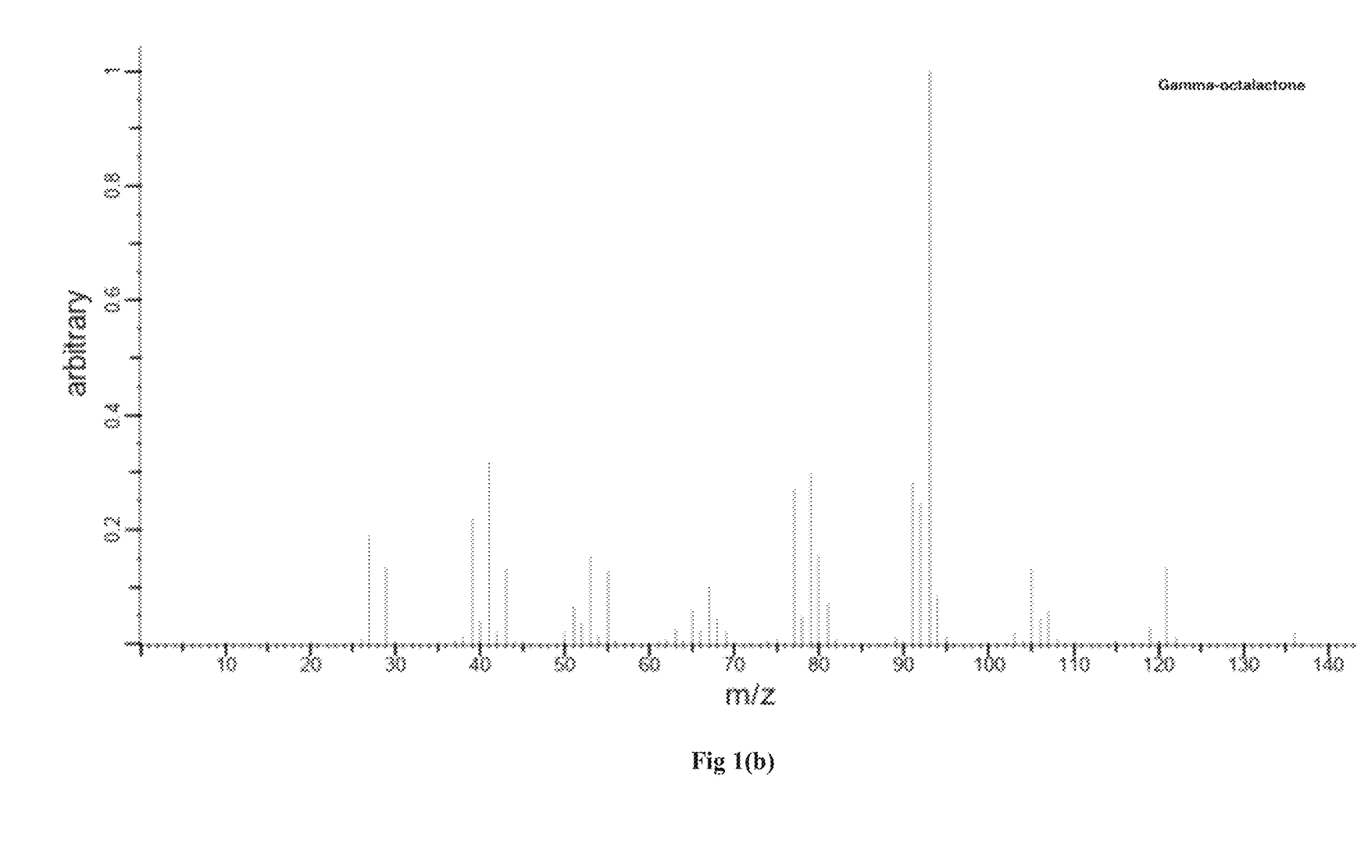
Figure 1C:
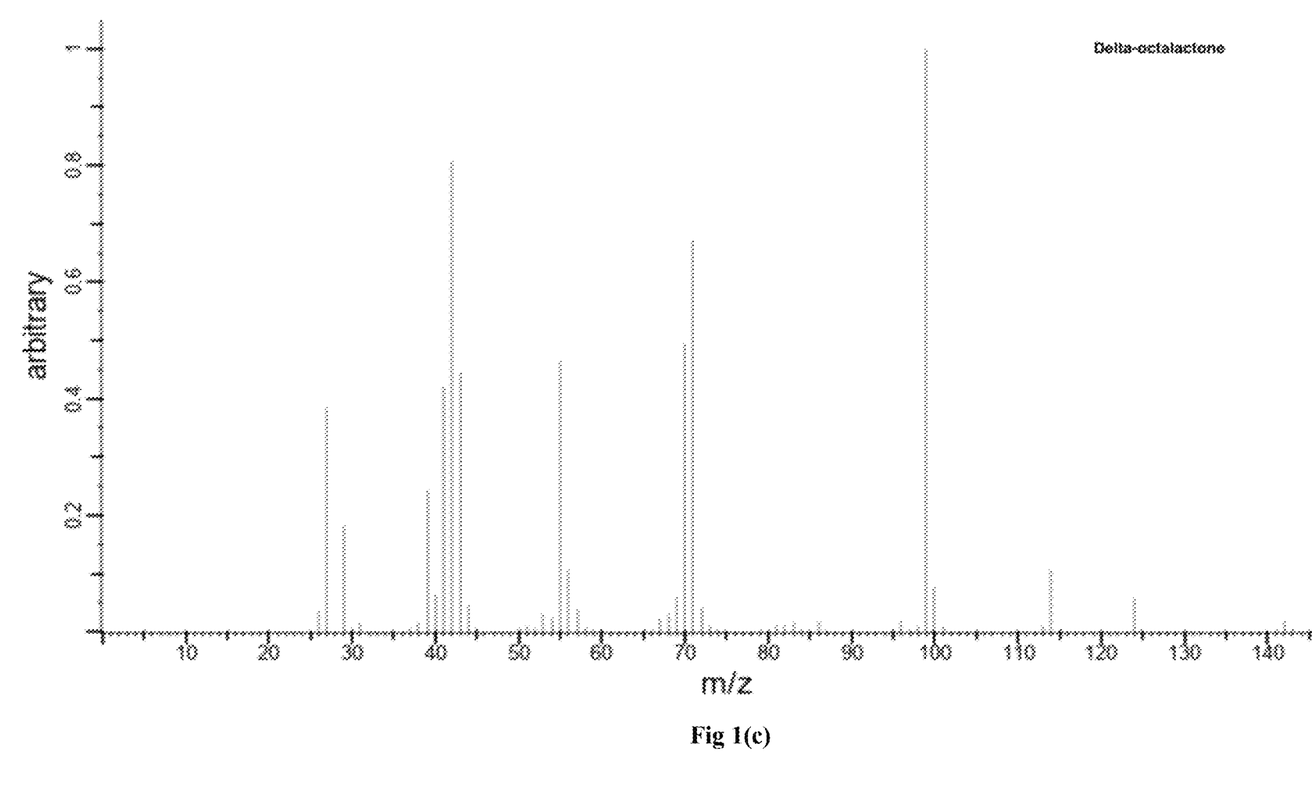
Figure 1D:
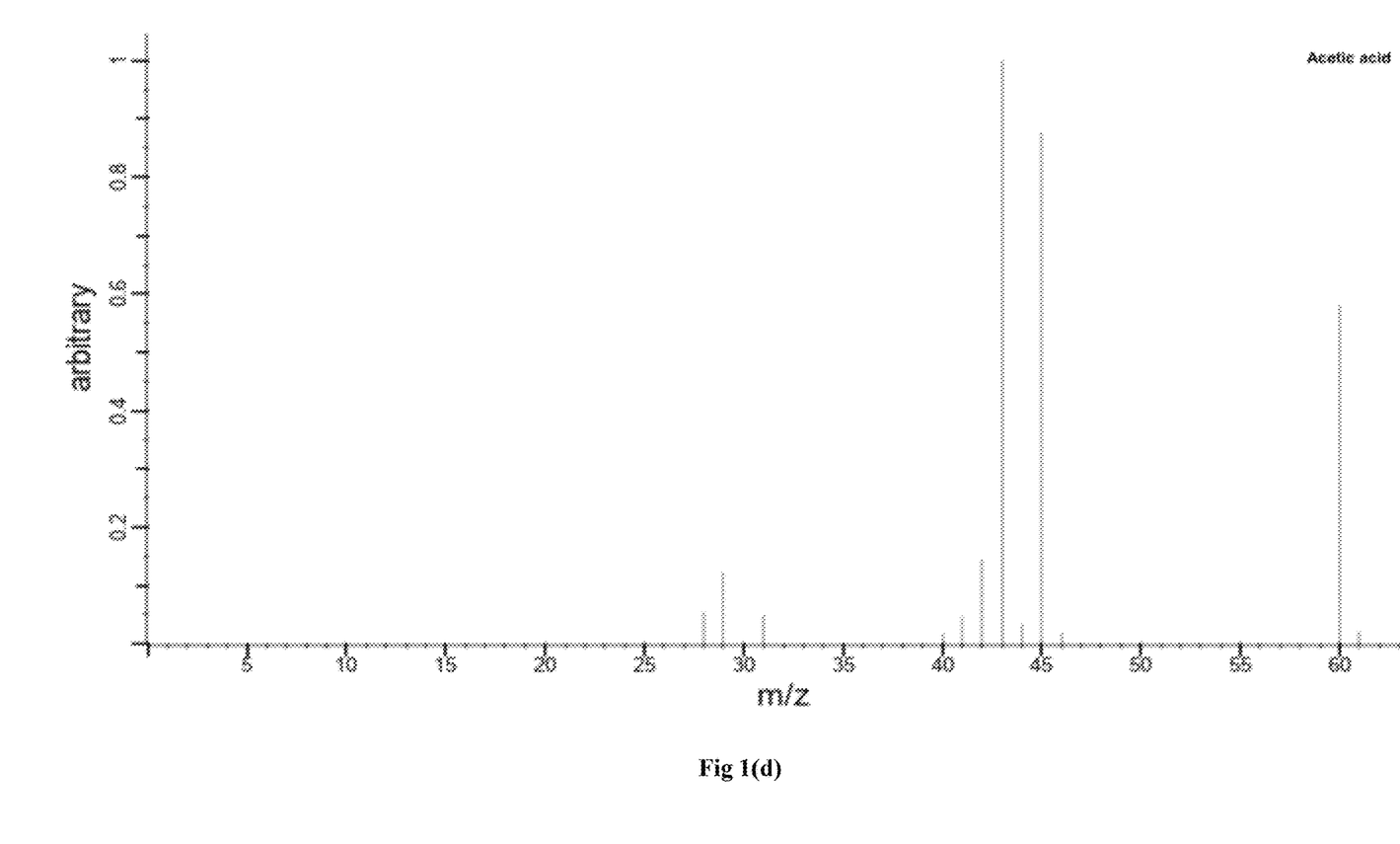
Figure 1E:
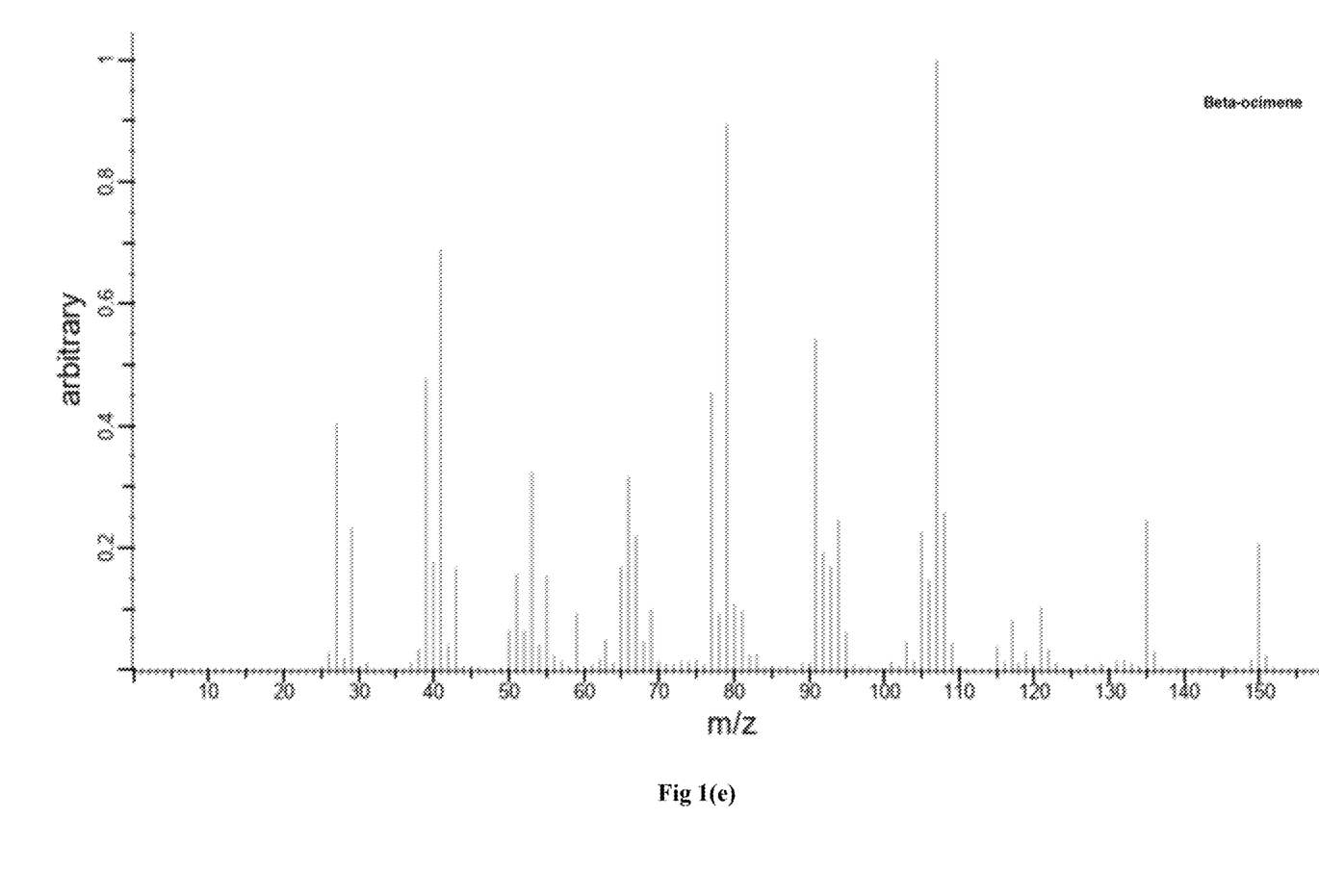
Figure 1F:
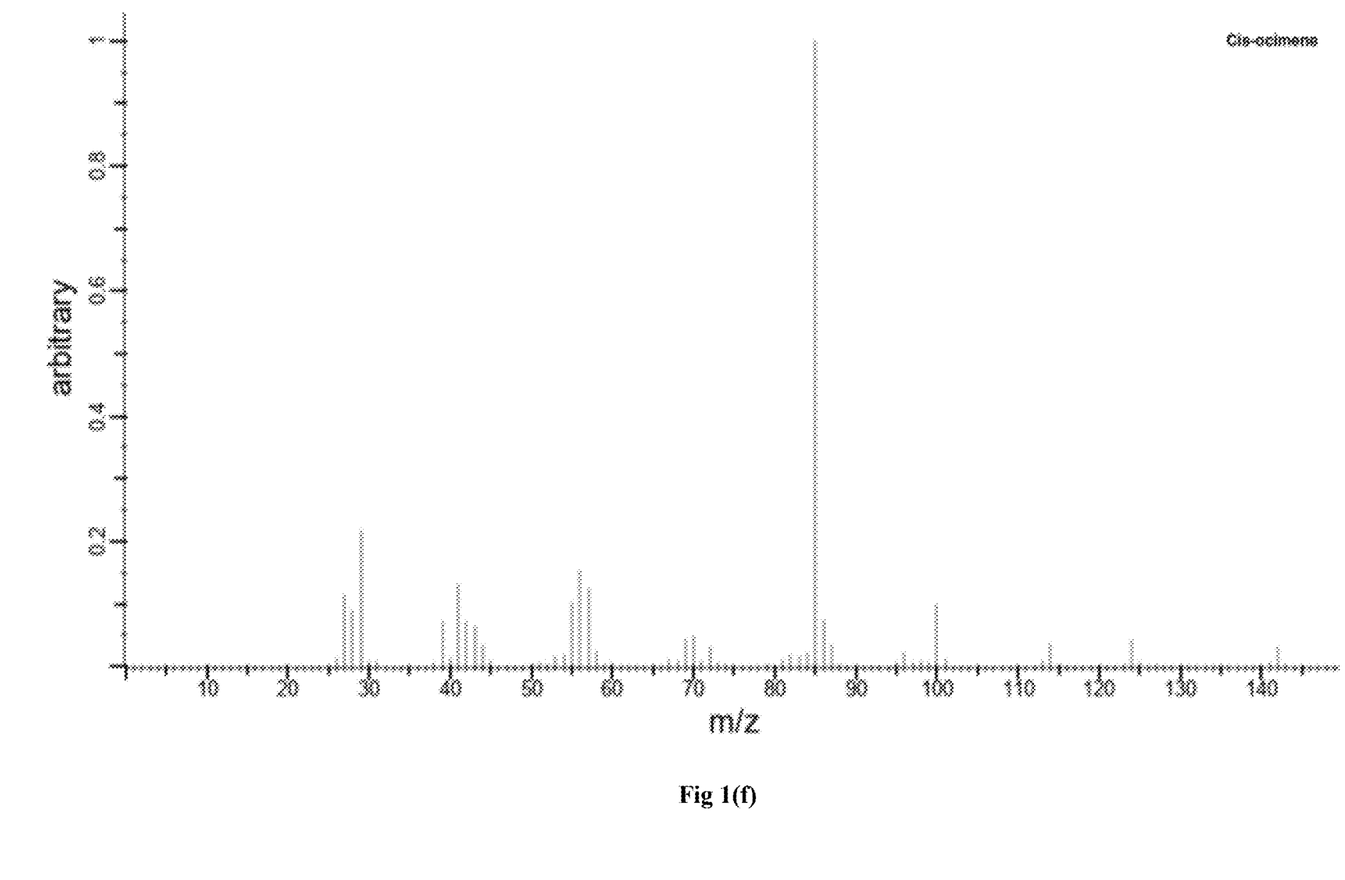
Figure 1G:
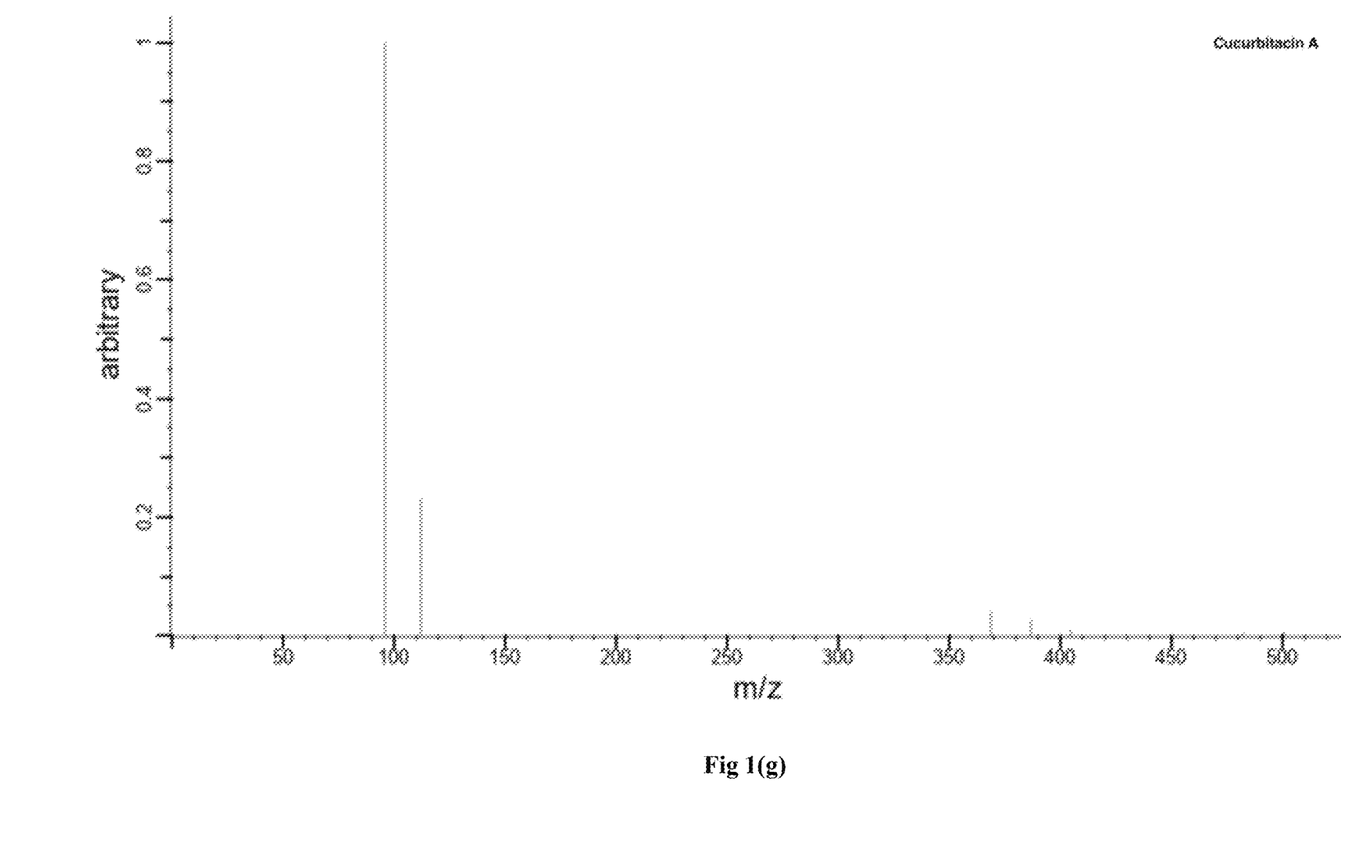
Figure 1H:
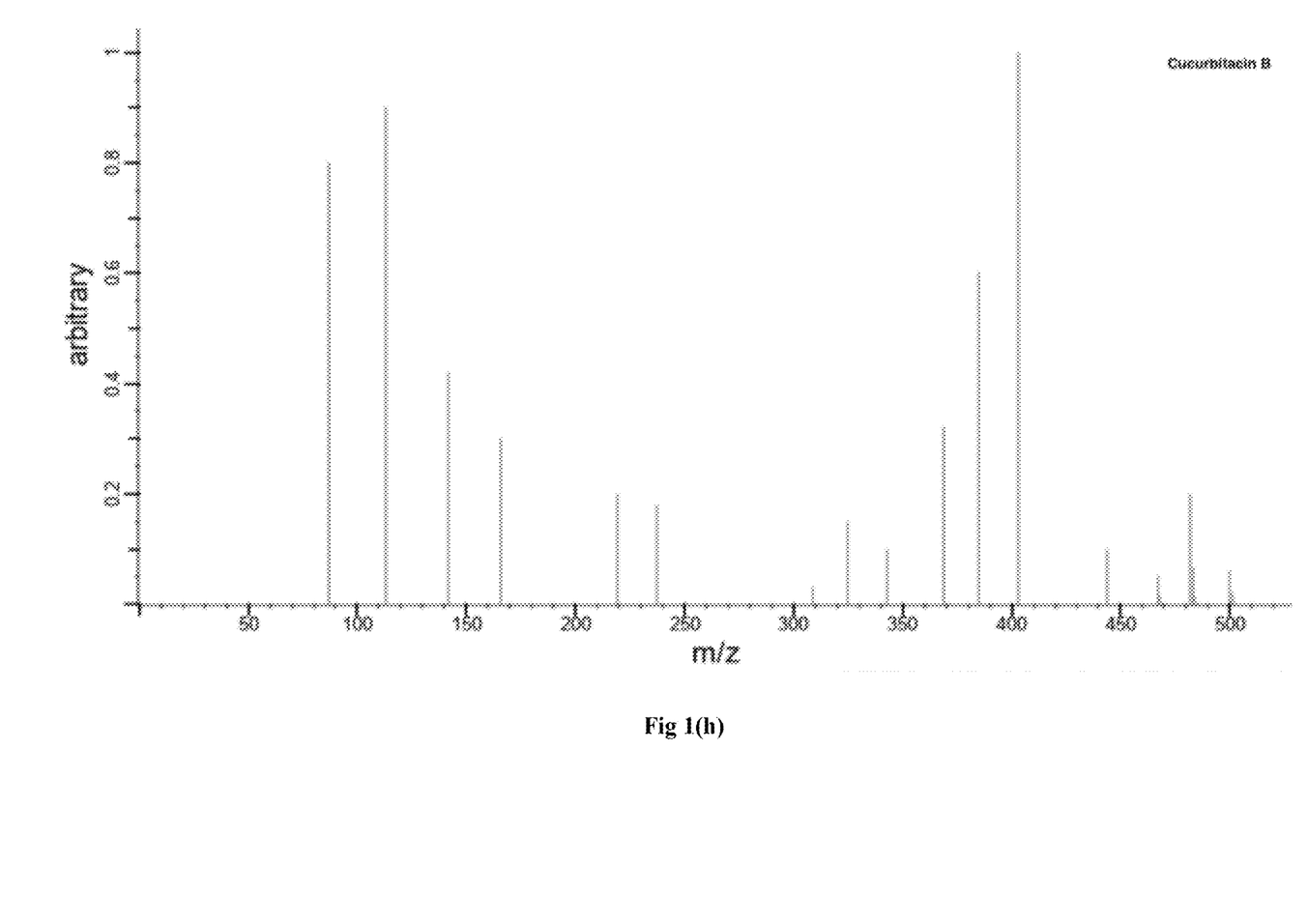
Figure 1I:
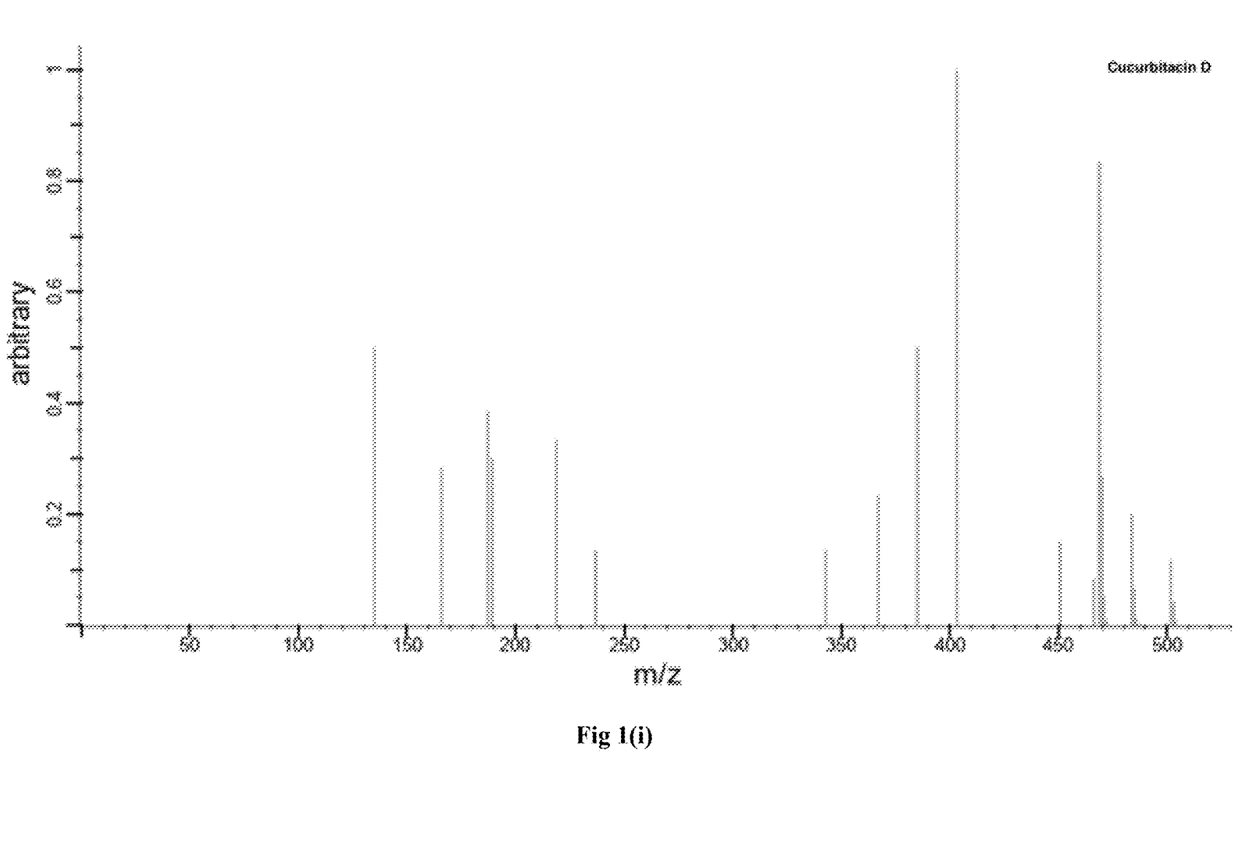
Figure 2:
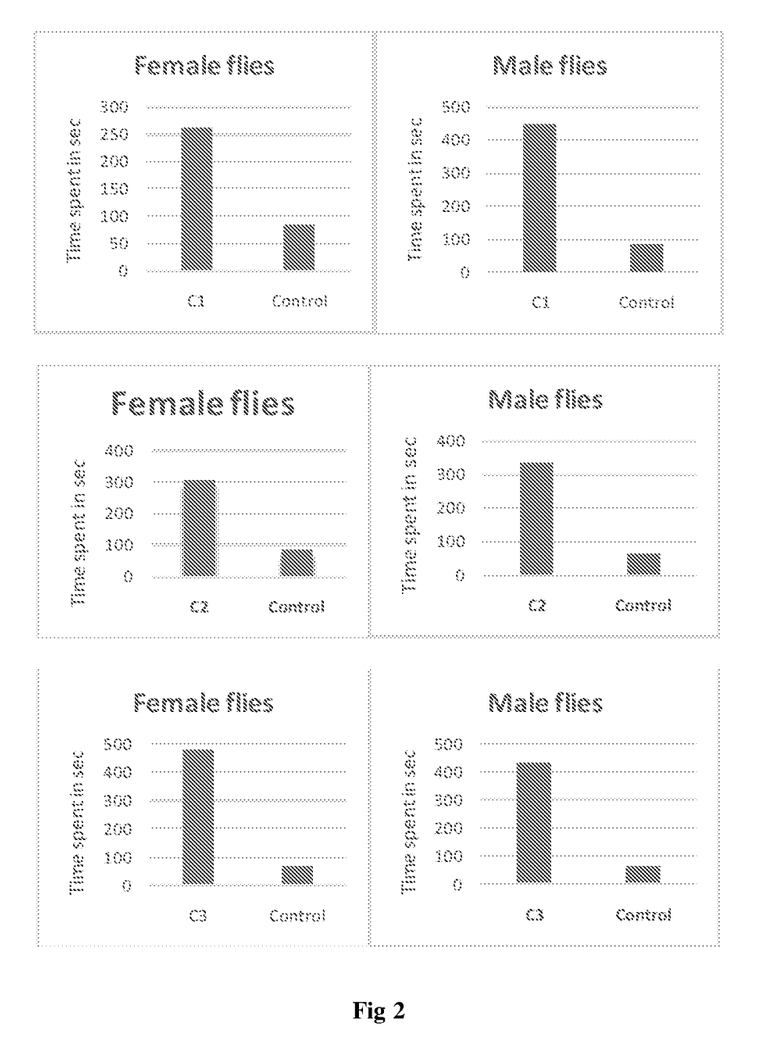
FIG. 2: Olfactometer studies showing the time spent by male and female *Bactrocera cucurbitae* in treated arms with formulation according to the present invention.
Figure 3:
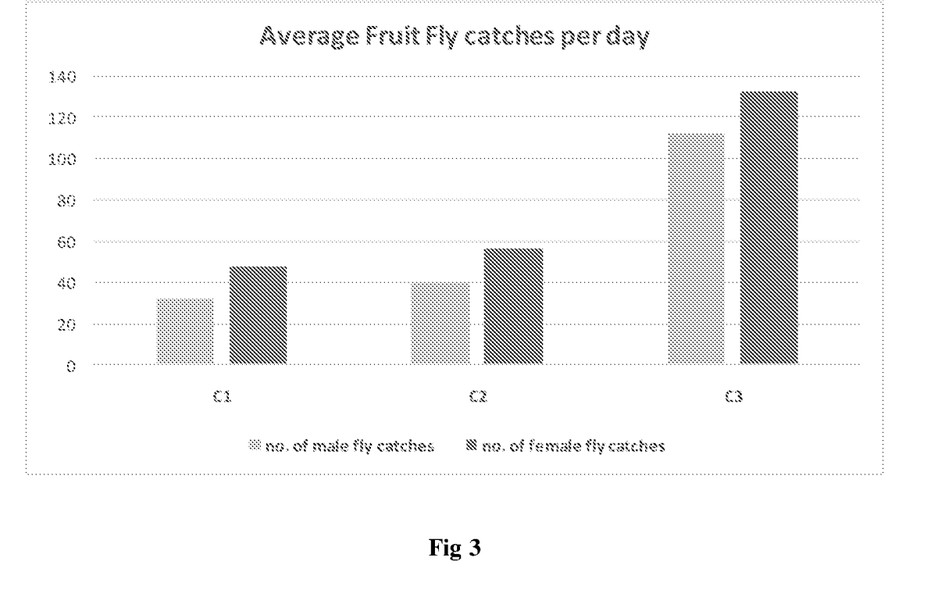
FIG. 3: Comparative field studies of different blend formulation of the present invention showing trapping capacity of number of male and female of *Bactrocera cucurbitae* fruit flies.

Electroantennographic responses to yeast or cucumber volatiles were recorded with a gas chromatograph coupled to a Syntech (IDAC-232, Hilversum, the Netherlands) electroantennogram detector system. The GC was equipped with a ZB-5 column (30×0.25 mm ID×0.25 μm film thickness, Phenomenex (Torrance, CA, USA), with helium as the carrier gas at 2.0 ml/min and a make-up gas of 2 ml/min, which was added before the splitter. The injector, in splitless mode, and flame ionization detector (GC-FID) were kept at 250° C. and 270° C., respectively. The oven was kept at 60° C. for 2 min, and the temperature was then raised by 10° C. min−1 to a final temperature of 230° C., which was maintained for 10 min. For electroantenno-detection, the insect head was cut off, and a reference electrode was inserted into its base with a glass capillary tube filled with KCl (0.1N). The distal end of the antenna was inserted into the tip of the recording glass capillary electrode. Antennae from both sexes were tested. Each antennal preparation was used only once. Humidified air (0.8l/min) was used to carry effluent from the EAD transfer line to the antennal preparation. The signals generated by the EAD and FID were passed through a Syntech IDAC-232 high-impedance amplifier and analysed with Syntech GC-EAD2000 software version 1.00. FID peaks that elicited EAD responses in at least seven runs were marked for identification by GC-mass spectrometry (GC-MS) (FIG. 1).

Example 4: Preparation of Liquid Formulation

The liquid formulation of the present invention is obtained by following the steps of (i) Preparing solution A, wherein the phagostimulants or kairomones are added one by one in an appropriate quantity and mixed well in 99% ethanol (ii) Preparing solution B, wherein stabilizer, emulsifying, thickening and the temperature stabilizing agents in an appropriate quantity and mixed in a sterile distilled water (iii) Mixing Solution A and B in the ratio of 1:1.5 to 1:12 to obtain the formulation C with required consistency.

The phagostimulants in solution A can be blend A1 comprising ethyl hexanoate esters, gamma octalactone, deltaoctalactone.

The phagostimulants in solution A can be blend A2 comprising acetic acid, β-ocimene, cis-ocimene and cucurbitacin A, B & D.

The phagostimulants in solution A can be blend A3 which is a combination of blend A1 and A2 comprising ethyl hexanoate esters, gamma octalactone, delta octalactone, acetic acid, β-ocimene, cis-ocimene and cucurbitacin A, B & D in the ratio ranging from 2:3.5:2:5:4:1:1 to 12:3:0.5:9:3:5:1

The solution B comprises stabilizer in the range of 0.5 to 10% w/v; emulsifying and thickening agent in the range of 0.5 to 10% w/v and temperature stabilizing agent in the range of 0.05 to 5% w/v.

The formulation C can be C1 (A1+B), C2 (A2+B) or C3 (A3+B).

In an exemplary preparation of the liquid formulation, the formulation comprises phagostimulants or kairomones as blend (0.1-5% w/v); glycerol as stabilizer (0.5 to 10% w/v); xanthum gum as emulsifying and thickening agent (0.5 to 10% w/v) and ammonium acetate as temperature stabilizing agent (0.05 to 5% w/v).

Example 5: Bioassay of the Formulation-Lab Study

Four-arm olfactometer (120 mm dia.) was used to measure behavioural responses of both female and male *Bactrocera cucurbitae* to volatiles extracts. Prior to each experiment, acrylic components were washed with a non-ionic detergent solution, rinsed with ethanol and distilled water, and left to air dry. Experiments were conducted in a controlled environment room (25±2° C., 60% RH). The central area was fitted with a filter-paper base (Whatmann No. 1, 12 cm dia.) to provide traction for the walking insects. The room was illuminated from above by uniform lighting from white lights to negate directional bias. Individual flies (10-15 days old) were introduced through a hole below the olfactometer. Each fly was given 5 min to acclimatize in the olfactometer, after which the experiment was run for 10 min for each replicate. The olfactometer was rotated 90° after each replicate to eliminate any directional bias. Air was drawn through the central hole at 200 ml min−1 and subsequently exhausted from the room. The central arena of the olfactometer was divided into four discrete odour fields corresponding to each of four inlet arms. A choice test was performed that used two different opposite arms. Test samples (10 ul) were pipetted onto filter paper strips and placed into one arm and the opposite arm of the olfactometer contained only solvent (10 μl). Flies starved for 24 h was allowed to make a choice between the treatments. Fly activity in each olfactometer was video recorded. The time spent in each arm was analysed using BORIS software. Ten replicates for each combination was conducted.

It was observed that formulation C3 was more efficient in attracting more number of male and female of *Bactrocera cucurbitae*. (FIG. 2)

Example 6: Bioassay of the Formulation-Field Study

Traps with lure formulation C1, C2 & C3 each ten in number were placed separately in cucumber plots of 1 acre each in 3 different locations with moderate level of infestation.

It was observed that formulation C3 was more efficient in attracting more number of male and female of *Bactrocera cucurbitae* (FIG. 3) proving the efficacy or the synergistic effect of the phagostimulants in the formulation.

While the invention has been described in connection with a illustrative embodiment, it is not intended to limit the scope of the present disclosure to the particular form set forth, but on the contrary, it is intended to cover such alternatives, modifications, and equivalents as may be included within the spirit and scope of the present disclosure.

The invention claimed is:

1. A formulation for controlling Tephritid fruit fly, *Bactrocera cucurbitae* comprising phagostimulant and additional agents; wherein the phagostimulant is a combination of ethyl hexanoate esters, gamma octalactone, delta octalactone, acetic acid, β-ocimene, cis-ocimene and a mixture of cucurbitacin A, B & D in the ratio ranging from 2:3.5:2:5:4:1:1 to 12:3:0.5:9:3:5:1; and the additional agents comprise a stabilizer, an emulsifier, a thickening agent, and a temperature stabilizing agent.

2. The formulation according to claim 1, wherein the stabilizer is glycerol, polyethylene glycol (PEG), or polyvinyl alcohol (PVA).

3. The formulation according to claim 1, wherein the stabilizer is in the range of 0.5-10% w/v of the formulation.

4. The formulation according to claim 1, wherein the emulsifier and the thickening agent are selected from a group consisting of gums, starches, and polysaccharides.

5. The formulation according to claim 1, wherein the emulsifier and the thickening agent together are present in the range of 0.5-10% w/v of the formulation.

6. The formulation according to claim 1, wherein the temperature stabilizing agent is ammonium carbonate, ammonium bicarbonate, diammonium phosphate, or ammonium acetate.

7. The formulation according to claim 1, wherein the temperature stabilizing agent is in the range of 0.05-5% w/v of the formulation.

8. A process of preparation of a formulation for controlling Tephritid fruit fly, *Bactrocera cucurbitae* comprising steps of:

a. preparing solution A, by adding phagostimulant one by one in a quantity to 99% ethanol;

b. preparing solution B, by mixing a stabilizer, an emulsifier, a thickening agent and a temperature stabilizing agents in a quantity with sterile distilled water; and c. mixing the solutions A and B in the ratio of 1:-1.5 to 1:12 to obtain the formulation;

wherein the phagostimulant in solution A is a combination of ethyl hexanoate esters, gamma octalactone, delta octalactone, acetic acid, β-ocimene, cis-ocimene and a mixture of cucurbitacin A, B & D, in the ratio ranging from 2:3.5:2:5:4:1:1 to 12:3:0.5:9:3:5:1; and wherein the stabilizer is glycerol, polyethylene glycol (PEG), or polyvinyl alcohol (PVA) in the range of 0.5-10% w/v; the emulsifier and the thickening agent are selected from a group consisting of gums, starches, and polysaccharides and are together present in the range of 0.5 to 10% w/v; and the temperature stabilizing agent is ammonium carbonate, ammonium bicarbonate, diammonium phosphate, or ammonium acetate in the range of 0.05 to 5% w/v.

* * * * *